United States Patent
Furon

[15] 3,667,287
[45] June 6, 1972

[54] ULTRASONIC TESTING SYSTEM
[72] Inventor: Leon D. Furon, Woodland Hills, Calif.
[73] Assignee: Air Products and Chemicals, Inc., Allentown, Pa.
[22] Filed: Nov. 30, 1970
[21] Appl. No.: 93,530

Related U.S. Application Data

[63] Continuation of Ser. No. 843,060, July 18, 1969, abandoned, which is a continuation of Ser. No. 564,697, July 12, 1966, abandoned.

[52] U.S. Cl. ............................................. 73/67.9, 315/26
[51] Int. Cl. ......................................................... G01n 29/04
[58] Field of Search .................................. 73/67.5–67.9, 35, 73/116; 315/25, 26

[56] References Cited

UNITED STATES PATENTS

| 2,407,898 | 9/1946 | Norgaard | 315/26 X |
| 2,449,848 | 9/1948 | Hefele | 315/26 X |
| 2,769,158 | 10/1956 | Schultz | 73/67.7 |
| 3,050,988 | 8/1962 | Gordon | 73/67.5 |

OTHER PUBLICATIONS

N. G. Neuweiler, Ultrasonics and Their Use for Non-destructive Testing of Materials, March– April 1950, pp. 60– 66, of Microtechnic.

*Primary Examiner*—Richard C. Queisser
*Assistant Examiner*—John P. Beauchamp
*Attorney*—Ronald B. Sherer, James C. Simmons and B. Max Klevit

[57] ABSTRACT

Electronic circuitry is described which provides two continuously available signals which include means for switching a desired one of the two displays on the cathode ray tube. A first sweep generator provides a full display of the signal. A second sweep generator provides an expanded display for showing only a desired test area. A switching circuit is provided to switch between the two sweep generators to display either the entire sweep signal or the test area. The unblanking signal provided to the cathode ray tube from the second sweep generator is superimposed onto the unblanking signal of the first sweep generator to brighten the area of interest during full sweep.

1 Claim, 14 Drawing Figures

PATENTED JUN 6 1972   3,667,287

INVENTOR.
Leon D. Furon
BY
James C. Simmons

INVENTOR.
Leon D. Furon
BY James C. Simmons

ULTRASONIC TESTING SYSTEM

CROSS-REFERENCE TO COPENDING APPLICATIONS

This application is a continuation of the copending application Ser. No. 843,060 filed July 18, 1969, now abandoned for Ultrasonic Testing System on behalf of Leon D. Furon, and assigned to the assignee of this invention which in turn was a continuation of application Ser. No. 564,697 filed July 12, 1966, now abandoned.

BACKGROUND OF THE INVENTION

1. Field of the Invention

This invention relates to ultrasonic testing systems, and more particularly to display systems used in such testing.

2. Discussion of the Prior Art

In the prior art there is provided nondestructive test equipment which generates ultrasonic vibrations by use of a search unit housing a crystal transducer. The vibrations from the transducer are sent in the form of an acoustical pulsed beam into the workpiece being tested. The beam travels unimpeded through large metallic parts and reflects back from the end surfaces thereof. Any flaw, defect, or other discontinuity in the workpiece also causes reflection of the acoustical beams back to the instrument which indicates the location and size of the discontinuity on a display such as a cathode ray tube.

The pulse of high frequency vibration is projected from the search unit into the workpiece. A portion of the pulse is reflected back by the flaw or defect and the balance is reflected from the end surfaces. The return energy is amplified and displayed on the cathode ray tube as vertical spikes. The screen on the oscilloscope shows spikes of the initial pulse, the defect, and the back and front surface reflections. Spacing of the spikes on the scope is in proportion to the distance the beam traveled in the material tested, thus locating the position of any flaw by irregularly spaced spikes.

In the absence of a flaw within the workpiece, only the transmitted front and back surface reflections would be appearing on the screen of the cathode ray tube. When a flaw is detected, as mentioned, an additional pulse signal is reflected and is displayed on the cathode ray tube. The area surrounding the pulse signal representing the flaw in the material is of particular interest to those testing the material.

In many cases, when a pulse signal indicating a flaw is detected, the operator of the test equipment expands the area of interest to permit a better survey and interpretation of the reflected information. This is done by showing in enlargement, only that portion of interest specified herein as the test area. This is accomplished generally by increasing the sweep speed of the cathode ray tube.

When expanding the test area by increasing the sweep speed, it is necessary to use a sweep delay to move a portion of the transmitted pulse, that is, the areas not of interest, off the cathode ray tube screen. Many times when the operator switches to a fast sweep, the test area may not be displayed on the cathode ray tube. The reason for this is that in switching back and forth the operator loses his reference points, including the transmitted pulse.

SUMMARY

In the described embodiment of a nondestructive tester for ultrasonic inspection of a workpiece, a pulse generator provides repetitive pulses of equal time to a transmitter. A search unit is responsive to the transmitter and is adapted to be acoustically coupled to the workpiece. The search unit includes a transducer which is adapted to receive the electrical energy from the transmitter and transmit corresponding ultrasonic energy into the workpiece. The transducer receives ultrasonic echo signals from the workpiece and transmits corresponding electrical energy to the receiver.

A cathode ray tube has vertical deflection plates coupled to the receiver and has horizontal deflection plates coupled to receive timing signals from the sweep generator. A delay generator delays the pulse generator signal for a predetermined time period. Means are provided for supplying unblanking signals to the grid electrode on the cathode ray tube. A first sweep generator is responsive to the delay means and generates a sweep signal for a predetermined time duration after a predetermined delay time. A second sweep generator generates a sweep signal for a second predetermined time duration. The first sweep generator provides a signal for displaying only the area of interest, and the second sweep generator displays the entire reflection of the received signals. A horizontal deflection amplifier is coupled to the horizontal deflection plate of the cathode ray tube. A switching means is provided for switching the signals to the horizontal deflection amplifier from either the first or second sweep generators. Means are provided for switching the delay time when the signals are switched.

Pulse signals representing the transmitted and reflected signals are normally displayed on a base line of the screen of a cathode ray tube. Flaws in the material being tested are represented by reflected pulse signals. Means is provided for selectively distinguishing or making brighter the portion of the base line related to the pulses resulting from flaws in the material. Switching means is provided to change the time base or speed of the sweep, and display only the selected portion related to the flaw signal.

Both signals which are able to display all reflections and the expanded speed-up signals which are indicative only of the test area or area of interest are continually generated. These signals are separately and independently switched into the horizontal amplifier for displaying. The back and forth switching is accomplished without disruption of any type to the signal. No readjustment is required once the original test area has been determined. Thus quick reference back to the set-up or entire picture is accomplished by the operator without throwing the displays out of focus or synchronization with the original reference base. The area of interest (test area) is brightened by proper setting of the test area generator and thereafter remains brightened on all visual displays switched onto the screen of the cathode ray tube.

DESCRIPTION OF THE DRAWINGS

These and other features and advantages will become more apparent to those skilled in the art when taken into consideration with the following detailed description wherein like reference numerals indicate like or corresponding parts throughout the several views, and wherein.

DESCRIPTION OF ONE PREFERRED EMBODIMENT

Figure 1:
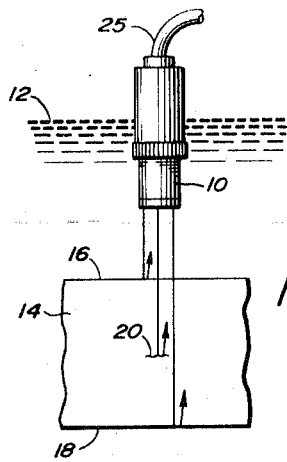
FIG. 1 is a view of an ultrasonic search unit and workpiece under test.

Turning now to the drawings, there is shown in FIG. 1 a search unit 10, comprised of an ultrasonic transducer. The search unit 10 is disposed in a liquid couplant 12, and adapted to transmit ultrasonic pulses into a workpiece 14. Water is sometimes used as a couplant because of its character of being able to transmit acoustic signals without attenuation.

In conventional ultrasonic systems, the search unit 10 is comprised of a piezoelectric transducer which is adapted to receive as well as to transmit ultrasonic acoustic signals. When a pulse signal from the search unit 10 encounters the front surface 16 of the workpiece 14, an acoustic signal is reflected therefrom. When the transmitted pulse from the search unit 10 is transmitted through the workpiece 14 and encounters the back surface 18, another acoustic pulse signal is reflected back to the search unit 10. If these were the only signals reflected back to the search unit 10, it would indicate that there is no flaw in the workpiece 14.

If the transmitted pulse from the search unit 10 encounters a flaw within the workpiece 14, a signal will be reflected back to the search unit 10. This flaw may be some irregularity or excessive strain within the workpiece 14. The flaw may be an area having a characteristic different from the workpiece being tested.

Figure 2:
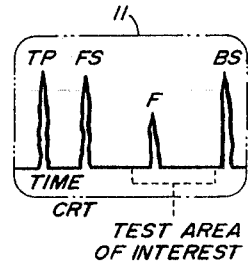
FIG. 2 represents a typical display on a cathode ray tube of signals generated by the search unit set forth in FIG. 1.

As represented on a cathode ray tube, the various pulse signals may be similar to that illustrated in FIG. 2. The transmitted pulse is designated TP. At a point later in time, the search unit 10 receives a reflected pulse signal from the front surface 16. This reflected signal is represented by FS. Still later in time, the search unit 10 receives a pulse signal from the flaw 20. This pulse signal is represented by F. At still a later time, a reflected pulse signal is transmitted to the search unit 10 from the back surface 18. This last reflected pulse is designated BS.

In viewing the cathode ray tube screen 11, an operator is made aware that there is a flaw in the material being tested and generally has to examine the flaw area more closely. This flaw area will be referred to subsequently in the specification as the test area of interest. As mentioned, one way of examining the test area of interest is to provide a faster sweep. Providing a faster sweep effectively results in a longer base line as illustrated in FIGS. 3 and 4.

Figure 3:
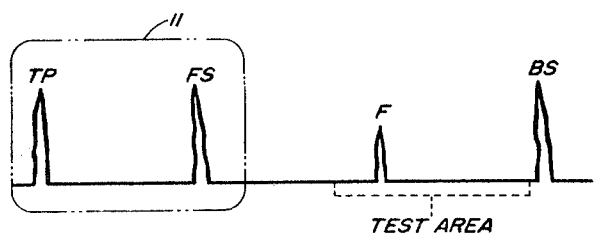
FIG. 3 represents information displayed in FIG. 2, with an accelerated sweep speed.
Figure 4:
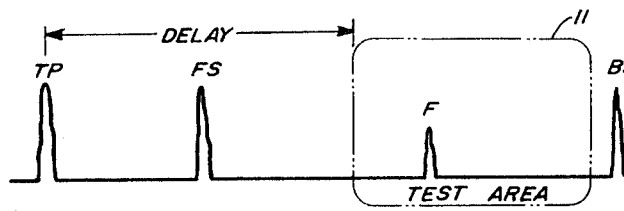
FIG. 4 represents information displayed in FIG. 3, with a delayed sweep.

Referring to FIG. 3, the expanded sweep results in only a portion of the total information being displayed. If the cathode ray screen 11 does not involve any delayed sweep, only the pulse signals TP and FS would be displayed. As illustrated, the pulse signal F and BS would be off the screen. By providing a variable delayed sweep, any selected segment of the base line illustrated in FIG. 2 may be illustrated in an expanded form. As illustrated in FIG. 4, the cathode ray screen 11, as a result of the delayed sweep, may now display the flaw signal F without displaying the other signals, which may not be of particular interest to the operator.

As will be seen, the present invention is directed toward a system which will enable an operator to pick out a particular area of interest on the cathode ray tube, and then by a simple switching operation display an expanded version of that particular area of interest. At the same time, an operator does not have to change his original test setup.

Figure 5:
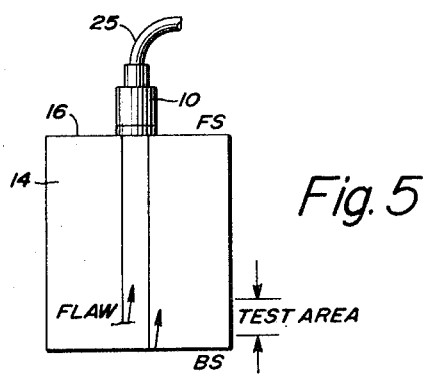
FIG. 5 illustrates an ultrasonic search unit and workpiece differently positioned from the one set forth in FIG. 1.
Figure 6:
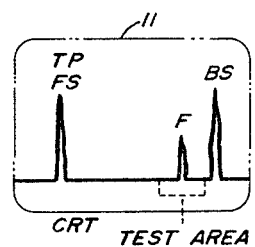
FIG. 6 represents a cathode ray tube displaying information from the search unit illustrated in FIG. 5.
Figure 7:
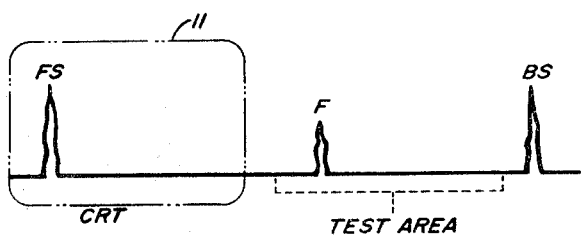
FIG. 7 represents the same information as that displayed in FIG. 6 with an accelerated sweep speed.
Figure 8:
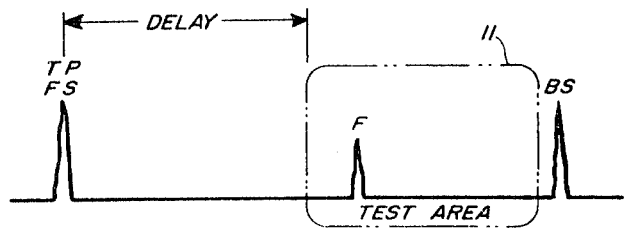
FIG. 8 represents the same information as that displayed in FIG. 6 with a delayed sweep.

The operation of the system illustrated in FIG. 5 is basically the same as that described in connection with FIG. 1. The main difference is that the search unit 10 physically contacts the front surface of the workpiece 14. This results in a situation where there is no separate reflected pulse from the front surface 16. This condition is illustrated in FIG. 6 wherein TP coincides in time with FS. FIGS. 7 and 8 are substantially similar to FIGS. 3 and 4, except for the absence of the reflected pulse signal from the front surface 16.

Figure 9A:
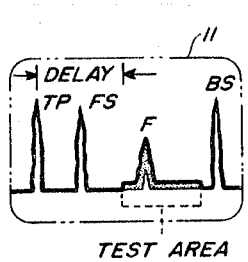
FIGS. 9a, 9b, 10a, 10b, and 10c illustrate various displays on a cathode ray tube shown for purposes of illustrating the present invention.
Figure 9B:
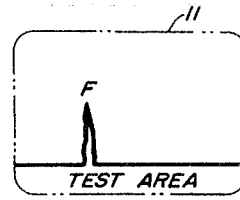
Figure 10A:
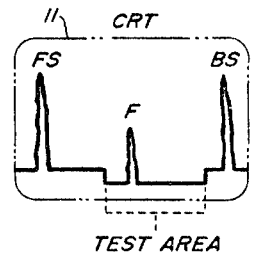
Figure 10B:
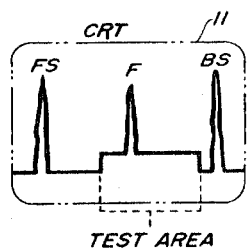
Figure 10C:
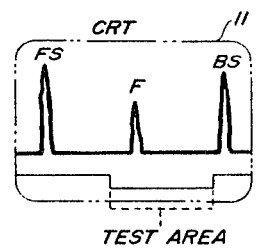

An operator may wish to select a particular test area prior to switching to the faster sweep speed. This can be accomplished in a number of ways. In FIG. 9a, for example, this is accomplished by providing a brightening pulse in the test area. FIG. 9b illustrates the test area alone. Another way of displaying the test area is by a step-down in the sweep as illustrated in FIG. 10a. FIG. 10b represents a step-up sweep. FIG. 10c represents a normal sweep along with a second sweep with a step-down area.

Basically, the present invention enables an operator to select and view a test area and its relation to the overall test pattern. Thus, the expanded version of the test area is viewed. Switching back and forth between full sweep and test area sweep can be accomplished without upsetting any of his original setup.

Figure 11:
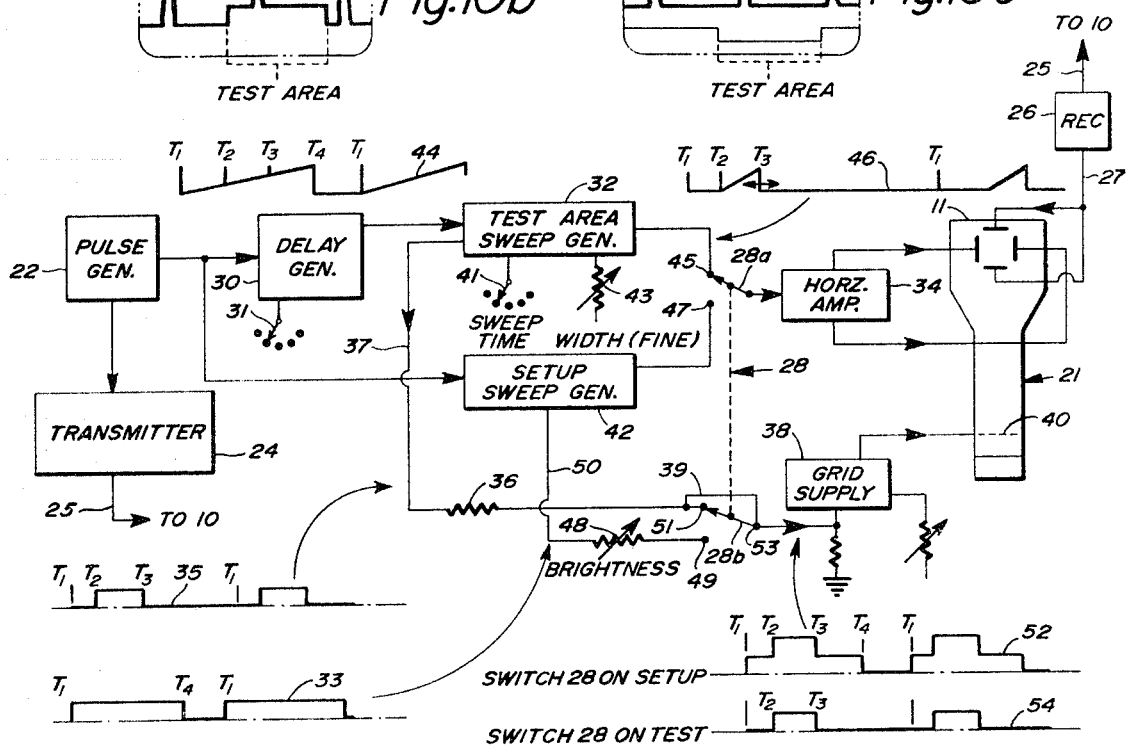
FIG. 11 is a block diagram of an overall system illustrating one embodiment of the present invention.

Turning now to FIG. 11, there is shown a schematic representation of one embodiment of the invention. In this embodiment, a pulse generator 22 generates a series of regularly programmed high voltage, high frequency pulses. These pulses are conducted simultaneously to the transmitter 24, to the delay generator 30, and to the setup sweep generator 42.

Transmitter 24 amplifies these pulses which are then conducted to search unit 10 (FIG. 1) by electrical conduit 25. These pulses are emitted by the transducer in the search unit 10 in such a manner as to be effectively reflected back to the search unit 10 in the manner indicated, for instance, in FIG. 1. These pulses are then returned by conduit 25 to the receiver 26 which amplifies the returned pulses and applies them through conduit 27 to the vertical deflection electrodes of cathode ray tube 21.

Simultaneously with the foregoing, pulses from pulse generator 22 are applied to setup sweep generator 42 for the purpose of starting the generation of a linear ramp voltage signal which serves to sweep the cathode ray spot across the screen 11 in synchronism with each pulse as shown in Graph 44, between $T_1$ and $T_4$. $T_1$ indicates the time at which the linear ramp voltage signal for setup sweep generator 42 begins. $T_2$ denotes the time at which the linear ramp voltage signal for test area generator 32 begins. $T_3$ indicates the time at which linear ramp voltage signal for the test area sweep generator 32 ends and $T_4$ indicates the time at which the linear ramp voltage signal for set-up sweep generator 42 ends. This signal is conducted to the horizontal amplifier 34, from the setup sweep generator 42 through terminal 47 of section 28 a of switch 28. Switch 28 is composed of sections 28 a and 28 b which are physically the same entity, the function of which will be more fully explained hereafter. At the same time, a second signal is sent from setup generator 42 by means of conduit 50 through brightness control 48 to terminal 49 of section 28 b of switch 28. Graph 33 represents a plot of square wave output voltage in conduit 50 against time. With switch 28 in the down position, this second signal is conducted through grid supply 38 to grid 40 of cathode ray tube 21. The result of the application of these two signals from the setup generator 42 to the horizontal plates and to the grid 40 of the cathode ray tube is to provide a time base or horizontal trace on the screen 11 of the cathode ray tube which is deflected vertically by the signal placed on the vertical electrodes of the cathode ray tube 21 by the transmitted pulse and the amplified return echo pulses from the search unit 10 through the receiver 26.

At the same time that the foregoing signals are being placed on the horizontal deflection electrodes and the grid 40 by the setup sweep generator 42, the test area sweep generator 32 is also generating signals. Graph 46 represents a plot of the output voltage of the test area sweep generator 32 against time as applied to the horizontal amplifier 34. The pulse from pulse generator 22 is applied to delay generator 30 which operates in a manner known to those skilled in the art, i.e., to delay its output pulse for a predetermined time after the input pulse. This delayed pulse is then applied to the input of the test area sweep generator 32. Generator 32 operates in a manner identical to sweep generator 42 to produce an output ramp signal which is conducted to terminal 45 of switch section 28 a and an output square wave through conduit 37 and resistor 36 to terminal 51 of switch section 28 b. Graph 35 represents a plot of square wave output voltage in conduit 37 against time. By means of conduit 39, which connects from terminal 51 to the common terminal 53 of switch section 28 b, the square wave signal from sweep generator 32 is impressed through grid supply 38 to grid 40 at all times.

Switch 28, operating as a whole, serves to present the following images on the screen 11 of the cathode ray tube 21.

When Switch 28 is in the down (setup) position, the ramp signal from setup sweep generator 42 is impressed on the horizontal deflection plates of the cathode ray tube, while the square wave brightness pulses from both sweep generators are impressed on the grid 40 through grid supply 38, as is plotted in Graph 52. By proper adjustment of delay adjust control 31 of delay generator 30 and test area sweep generator comprising a sweep time control 41 for coarse width adjustment and width control 43 for line adjustment, the visible trace on the face of the cathode ray tube will show one brightness level for the entire width of the trace with a higher brightness level for the test area of interest as determined by the settings of delay adjust control 31 and sweep width control 43, as indicated in FIG. 9 a. Once the operator has adjusted the proper control so that the brightened test area of interest is properly positioned for his purpose, the switch 28 may be positioned in the upper mode. This serves to remove the setup sweep generator signal from the face 11 and simultaneously apply the signal from the test area sweep generator 32 to the horizontal deflection plates via switch section 28 a. By the action of switch section 28 b the brightness signal from the setup generator 42 is removed, leaving the signal from the test area sweep generator 32 as shown in Graph 54. Then, by proper manipulation of width control 41, 43, the operator may cause the test area trace to be expanded horizontally on the cathode ray tube screen so that when the display is changed from that shown in FIG. 2 to that shown in FIG. 4 there will be no loss of the desired area of interest. It is this last feature of positive retention of identification of signal area of interest which is the main and desired product of this invention.

Having thus described but one preferred embodiment of this invention, what is claimed is:

1. In a nondestructive tester for ultrasonic inspection of a workpiece of the type comprising a pulse generator to provide pulses, a transmitter responsive to said pulse generator, a receiver, an ultrasonic search unit adapted to be acoustically coupled to the workpiece, and a transducer positionable in said search unit and being adapted to receive electrical energy from said transmitter and transmit corresponding ultrasonic energy into the workpiece and to receive ultrasonic echo signals from the workpiece and transmit corresponding electrical energy to said receiver the improvement which comprises;

a delay means responsive to pulses from said pulse generator;

a first sweep generator coupled to said delay means for simultaneously providing a ramp signal and a square wave signal having a first time duration in response to each delayed pulse;

a second sweep generator coupled to said pulse generator for simultaneously providing a ramp signal and a square wave signal having a second time duration in response to each pulse;

a cathode ray tube display, the cathode ray tube includes horizontal deflection plates coupled to said first sweep generator through a horizontal amplifier to alternatively receive the ramp signal of said first sweep generator and the ramp signal of said second sweep generator and vertical deflection plates coupled to said receiver;

coupled between said first and second generators and a grid electrode in said cathode ray tube is a grid supply and means for providing a continuous square wave signal from said first generator to said grid electrode and square wave signal from said second generator to said cathode ray tube equal in time duration to said ramp signal of said first sweep generator, the square wave signal from said first generator being of a shorter time duration than said square wave signal from said second generator, said first square wave signal serving to provide added brightness during a portion of the sweep operation of said second sweep generator; and switching means coupled to said display means for switching between the output signals generated by said first sweep generator and the combination of the square wave signal from said first generator together with both output signals from said second sweep generator.

* * * * *